United States Patent Office 2,852,494
Patented Sept. 16, 1958

2,852,494

PROCESS FOR THE PRODUCTION OF POLYUREAS

Wolfgang Lehmann, Leverkusen-Bayerwerk, and Heinrich Rinke, Leverkusen, Germany, assignors to Farbenfabriken Bayer Aktiengesellschaft, Leverkusen, Germany, a corporation of Germany No Drawing. Application January 26, 1956
Serial No. 561,641

Claims priority, application Germany January 29, 1955

6 Claims. (Cl. 260—77.5)

This invention relates to an improvement in the production of polyureas. More particularly, the present invention is concerned with a process for producing polyureas by reacting a diisocyanate in an organic solvent with an aqueous solution of a diamine salt in the presence of alkali.

It is known to produce polyureas from diisocyanates and diamines. In accordance with one method (Angewandte Chemie, A. 59, 257–273 (1947)), the reaction is carried out in inert organic solvents and tends to result in the formation of cross-linked polymers. In accordance with another method (British Patent 535,139) alcohols or phenols are used as the reaction medium, whereby predominantly linear products are obtained. It is also known (German Patent 838,217) to produce polyureas from diisocyanates and carbamates of diamines.

It is an object of the present invention to provide a process for the production of linear polyureas which are free of cross-linked by-products. Another object is to provide a process by which linear polyureas can be obtained in a simple manner and without the use of organic solvents. Further objects will appear hereinafter.

These objects are attained in accordance with the present invention by adding alkali to a mixture prepared from a dispersion (solution or suspension) of a diisocyanate in an inert solvent and an aqueous solution of a diamine salt, using the alkali in such an amount as to completely decompose said diamine salt. In accordance with a preferred embodiment of the invention, a solution or suspension of a diisocyanate in an organic solvent is intimately mixed with a solution of a diamine in an aqueous mineral acid and a small amount of an emulsifier to form a homogeneous mixture. Thereupon, the calculated amount of alkali in the form of an aqueous sodium hydroxide solution is introduced into this mixture with stirring and cooling. When the addition of the sodium hydroxide solution is completed, the stirring is continued for about 1 to 5 hours at room temperature or slightly elevated temperature and then the polyurea formed in the reaction mixture is recovered by filtration or centrifugation.

In a modification of the above method, mixed polyureas-polyurethanes are obtained in one step by adding alkali to a mixture containing about equimolecular proportions of a diamine salt and a diisocyanate, and about equimolecular proportions of a diamine salt and a bis-chlorocarbonic acid ester, using the alkali in such an amount as to completely bind the acid formed in the reaction. Since the polyaddition reaction between diisocyanate and diamine proceeds at about the same rate as the polycondensation reaction between bis-chlorocarbonic acid ester and diamine, the combination of both reactions in accordance with the present invention results in polyureas containing urethane linkages in their molecule. Such copolymers were heretofore obtainable only via the intermediate stage of prepolymers.

Depending upon the conditions of reaction, such as concentration of the reactants, molar ratio of diisocyanate or mixture of diisocyanate and bis-chlorocarbonic acid ester to diamine or polyamine, temperature, and rate of addition of the alkali, polymers of various chain lengths may be obtained.

In carrying out the process of the invention, temperatures ranging from about −5° C. to about +2° C. have proven to be particularly suitable. If the reaction is carried out in the presence of an organic solvent miscible with water, such as methanol, ethanol, glycerol, tetrahydrofuran and acetone, it is possible to use lower temperatures because of the depression of the melting points caused thereby.

Inert organic solvents which are suitable as reaction media include, inter alia, benzene, toluylene, xylene, gasoline, methylene chloride and chloroform. It is advantageous to carry out the reaction in the presence of an emulsifier in order to form a homogeneous reactive mixture. As emulsifiers, there may be used the reaction products of alcohols or phenols with ethylene oxide.

Representative examples of diisocyanates which may be reacted with diamine salts in accordance with the instant invention are ethylene diisocyanate, 1,4-tetramethylene diisocyanate, 1,5-pentamethylene diisocyanate, 1,6-hexamethylene diisocyanate, 1,8-octamethylene diisocyanate, 1,18-hexadecamethylene diisocyanate, 1,2-propylene diisocyanate, 1,4-cyclohexylene diisocyanate, $\omega,\omega'$-diisocyanate dipropylether and the like.

Suitable diamines include ethylene diamine, trimethylene diamine, tetramethylene diamine, pentamethylene diamine, hexamethylene diamine, decamethylene diamine, cyclohexylene diamine, $\gamma,\gamma'$-diamino propylether, $\gamma,\gamma'$-diaminopropyl methylamine, diethylene triamine, dipropylene triamine, diaminopropyl tetramethyl diamine, diaminohexyl ethylene diamine, etc. By dissolving these or other diamines in diluted mineral acids there are obtained aqueous solutions of diamine salts, which are used as reactants in the process of the invention.

Among the bis-chlorocarbonic acid esters which may be employed are ethylene-, trimethylene-, tetramethylene- and hexamethylene-bis-chlorocarbonic acid ester. Furthermore, there may be used the bis-chlorocarbonic acid esters derived from $\omega,\omega'$-dihydroxy dialkyl ether, $\omega,\omega'$-dihydroxy dialkyl thioether and others.

The linear polyureas and mixed polyureas-polyurethanes obtainable by the process of the invention may be made into synthetic fibers and threads. Polyureas and mixed polyureas-polyurethanes containing basic groups in their molecule are soluble in diluted acids and may be used as binders in the production of pigment pastes. They are also suitable for use as impregnation agents for textiles.

The details of the present invention will be apparent to those skilled in the art from a consideration of the following specific examples which are illustrative only and are in no way to be construed as limiting. Parts mentioned are parts by weight.

Example 1

2 liters of ice-cold N. sodium hydroxide solution are added over a period of 30 minutes with stirring and cooling with ice to a mixture prepared from (1) a suspension of 168 parts (1 mol) of hexamethylene diisocyanate in 1 liter of toluene, (2) a solution of 132 parts (1 mol) of $\gamma,\gamma'$-diaminodipropyl ether in 1.3 liters of water and 2 liters of N. hydrochloric acid and (3) 18 parts of benzyl-p-hydroxydiphenyl polyglycol ether as emulsifier. After stirring for 2 more hours at room temperature the precipitate is filtered off with suction, washed several times with water and dried at 80° C. in vacuo.

Yield: 234 parts (78% of the theoretical).
Viscosity number: $z\eta = 95 \times 10^{-3}$.
Melting point: 225°–227° C.

At 260° C. the polyurea can be drawn into threads which can be stretched in the cold and dyed easily with acid dyes.

Example 2

A solution of 168 parts (1 mol) of 1,6-hexamethylene diisocyanate in ½ liter of toluene is poured into an ice-cold solution of 194.4 parts (1 mol) of a mixture of undeca- and dodeca-methylene diamine in 1.5 liters of water and 2 liters of N. sulfuric acid, said solution containing 10 parts of benzyl-p-hydroxydiphenyl polyglycol ether as emulsifier. After forming an emulsion by stirring, 2 liters of N. sodium hydroxide solution are added over a period of 1 hour with stirring and cooling with ice. After stirring for 2 more hours at room temperature the weakly alkaline (pH: 7.6) dispersion is neutralized with dilute sulfuric acid (required amount about 20 cc.), the precipitate filtered off, washed several times with water and dried at 80° C.

Yield: 345 parts (90% of the theoretical).
Viscosity number: $z\eta = 124 \times 10^{-3}$.
Melting point: 208°–210.5° C.

The polyurea can easily be drawn into threads at 240° C. The threads can be stretched in the cold to 4 times their original length.

Example 3

An ice-cold solution of 168 parts (1 mol) of 1,6-hexane diisocyanate in 1 liter of toluene is added with stirring at 0° C. to a solution of 145 parts (1 mol) of γ,γ'-diaminopropylmethylamine in 3 liters of N. hydrochloric acid, which solution contains 15 parts of benzyl-p-hydroxydiphenyl polyglycol ether as emulsifier. Upon formation of a suspension, 3 liters of N. sodium hydroxide solution are added with stirring over a period of 30 minutes, maintaining an external cooling temperature of —2° C. Upon addition of about ½ of the alkali solution the suspension becomes thicker. Shortly thereafter, the polyurea formed starts separating out in the form of a finely grained precipitate. Upon stirring for 5 more hours at room temperature, the precipitate is filtered off, washed several times with water and dried at 80° C. in vacuo.

Yield: 222 parts.
Viscosity number: $z\eta = 189 \times 10^{-3}$.
Melting point: 208°–210° C.

The polyurea is soluble in dilute acetic acid and forms a viscous solution therein.

Example 4

3.6 liters of N. sodium hydroxide solution are added with vigorous stirring at 0° C. to a mixture containing 0.2 mol (33.6 parts) of hexamethylene diisocyanate, 0.8 mol (172 parts) of butane bis-chlorocarbonic ester, 1 liter of toluene, 1 mol (116 parts) of hexamethylene diamine, 2 liters of n-hydrochloric acid and 20 parts of benzyl-p-hydroxy diphenyl polyglycol ether, then the mixture is heated for 2 hours at 60° C. The precipitate is filtered off with suction, washed several times with water and dried at 80° C.

Yield: 206 parts (82%).
Viscosity number: $z\eta = 109 \times 10^{-3}$.
Melting point: 168° to 173° C.

Example 5

An ice-cold solution of 84 parts (0.5 mol) of hexamethylene diisocyanate and 107.5 parts (0.5 mol) of butane bis-chlorocarbonic acid ester in 800 cc. of toluene is mixed with an ice-cold solution of 132 parts (1 mol) of γ,γ'-diaminopropyl ether in 2 liters of N. hydrochloric acid, 1 liter of water and 15 parts of benzyl-p-hydroxy diphenyl polyglycol ether. To the mixture there are added with vigorous stirring at —1° C., 3 liters of N. sodium hydroxide solution over a period of 45 minutes. After stirring for 4 hours at room temperature, the finely grained precipitate is filtered off, washed several times with water and dried at 60° C. in vacuo.

Yield: 232 parts (81%).
Viscosity number: $z\eta = 78 \times 10^{-3}$.
Melting point: 209° to 210.5° C.

The melted polyurea can easily be processed into threads, which can be stretched in the cold.

Example 6

2 mols of N. sodium hydroxide solution are added with vigorous stirring over a period of 1 hour at a temperature of 0° C. to an ice-cold suspension prepared from: (1) 1 mol (168 parts) of hexamethylene diisocyanate in ½ a liter of toluene, (2) a solution of 1 mol of hexamethylene diamine in 2 liters of N. hydrochloric acid and 1 liter of water and (3) 1 part of benzyl-p-hydroxy diphenyl polyglycol ether. After stirring for 3 hours at room temperature, the polyurea formed is filtered off with suction, washed several times with water and dried at 80° C. in vacuo.

Yield: 241 parts (85%).
Viscosity number: $z\eta = 76 \times 10^{-3}$.
Melting point: 270° to 272° C.

Example 7

3 liters of an ice-cold N. sodium hydroxide solution are added with vigorous stirring and cooling with ice over a period of 25 minutes to a suspension prepared from: (1) 171.3 parts (1.02 mol) of hexamethylene diisocyanate in 1 liter of toluene, (2) a solution of 137.8 parts (0.95 mol) of γ,γ'-diamino-propyl methylamine and 5.15 parts (0.05 mol) of diethylene triamine in 1.5 liters of water and 3 liters of N. hydrochloric acid and (3) 18 parts of benzyl-p-hydroxy diphenyl polyglycol ether as emulsifier. After stirring for 1 more hour, the precipitate is filtered off with suction, washed several times with water and dried at 80° C. in vacuo.

Yield: 260 parts (85%).
Melting point: 210° to 212° C.

The polyurea readily dissolves in dilute acetic acid. A 10% solution has a viscosity of 174 cps. at 25° C.

If in the above procedure, 1.03 mol of hexamethylene diisocyanate are used in place of 1.02 mol, a basic polyurea is obtained, the acetate of which has a viscosity of 1560 cps. (measured with a 10% solution at 25° C.).

The above description and examples are intended to be illustrative only. Any modification of or variation therefrom which conforms to the spirit of the invention is intended to be included within the scope of the claims.

What is claimed is:

1. A method for making a polyurea which comprises decomposing a diprimary aliphatic diamine salt into the corresponding diamine by mixing an alkali metal hydroxide with an admixture of said diamine salt, water, an aliphatic diisocyanate and an inert organic solvent at a temperature of not above about +2° C., said diamine and said diisocyanate being present in substantially equal molecular proportions in said admixture, and effecting chemical reaction between the diamine and diisocyanate to form a polymer.

2. The process of claim 1 wherein said diisocyanate is dispersed in said inert organic solvent.

3. The process of claim 1 wherein said alkali metal hydroxide is sodium hydroxide.

4. The process of claim 1 wherein said diamine salt is dissolved in an aqueous mineral acid.

5. The process of claim 1 wherein said alkali metal hydroxide is mixed with said admixture at a temperature between about —5° C. and about +2° C.

6. A method for making a polyurea which comprises decomposing a diprimary aliphatic diamine salt into the corresponding diamine by mixing an alkali metal hydroxide with an admixture of said diamine salt, water, an aliphatic diisocyanate, an inert organic solvent and an alkylene bis-chlorocarbonic acid ester at a temperature of not above about +2° C., the sum of the mols of diisocyanate and alkylene bis-chlorocarbonic acid ester being substantially equal to the number of mols of diamine salt in said admixture, and effecting chemical reaction between the diamine and diisocyanate to form a polymer.

References Cited in the file of this patent

UNITED STATES PATENTS

| | | |
|---|---|---|
| 2,292,443 | Hanford | Aug. 11, 1942 |
| 2,660,574 | Jones et al. | Nov. 24, 1953 |
| 2,660,575 | Jones et al. | Nov. 24, 1953 |
| 2,761,852 | Lehmann et al. | Sept. 4, 1956 |

FOREIGN PATENTS

| | | |
|---|---|---|
| 535,139 | Great Britain | Mar. 31, 1941 |

UNITED STATES PATENT OFFICE
CERTIFICATE OF CORRECTION

Patent No. 2,852,494            September 16, 1958

Wolfgang Lehmann et al.

It is hereby certified that error appears in the printed specification of the above numbered patent requiring correction and that the said Letters Patent should read as corrected below.

Column 2, line 40, for "trimethylene," read -- trimethylene-, --; column 3, line 23, for "90%" read -- 95% --.

Signed and sealed this 6th day of January 1959.

(SEAL)
Attest:

KARL H. AXLINE
Attesting Officer

ROBERT C. WATSON
Commissioner of Patents